United States Patent
Nagori et al.

(10) Patent No.: US 10,186,024 B2
(45) Date of Patent: Jan. 22, 2019

(54) METHOD AND SYSTEM FOR REAL TIME STRUCTURE FROM MOTION IN A COMPUTER VISION SYSTEM

(71) Applicant: Texas Instruments Incorporated, Dallas, TX (US)

(72) Inventors: Soyeb Nagori, Bangalore (IN); Manu Mathew, Bangalore (IN); Prashanth Ramanathpur Viswanath, Bangalore (IN); Deepak Kumar Poddar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 98 days.

(21) Appl. No.: 15/197,749

(22) Filed: Jun. 29, 2016

(65) Prior Publication Data

US 2017/0186177 A1  Jun. 29, 2017

(30) Foreign Application Priority Data

Dec. 29, 2015  (IN) ............................ 7029/CHE/2015

(51) Int. Cl.
  *G06K 9/00* (2006.01)
  *G06T 5/50* (2006.01)
  *G06T 7/579* (2017.01)

(52) U.S. Cl.
  CPC ............... *G06T 5/50* (2013.01); *G06T 7/579* (2017.01); *G06T 2207/10016* (2013.01); *G06T 2207/10028* (2013.01); *G06T 2207/20221* (2013.01); *G06T 2207/30244* (2013.01); *G06T 2207/30252* (2013.01)

(58) Field of Classification Search
  None
  See application file for complete search history.

(56) References Cited

U.S. PATENT DOCUMENTS

| | | | |
|---|---|---|---|
| 7,397,970 B2 * | 7/2008 | Han | F41G 7/2226 382/103 |
| 8,442,307 B1 | 5/2013 | Anati et al. | |
| 8,798,357 B2 * | 8/2014 | Sinha | G06K 9/00664 345/419 |
| 2014/0010407 A1 | 1/2014 | Sinha et al. | |
| 2014/0037189 A1 | 2/2014 | Ziegler et al. | |
| 2014/0139635 A1 * | 5/2014 | Chandraker | H04N 13/204 348/46 |

OTHER PUBLICATIONS

J. L. Barron et al, "Performance of Optical Flow Techniques", International Journal of Computer Vision, vol. 12, 1994, pp. 43-77.

(Continued)

*Primary Examiner* — Nancy Bitar
(74) *Attorney, Agent, or Firm* — Ronald O. Neerings; Charles A. Brill; Frank D. Cimino

(57) ABSTRACT

Methods and systems providing for real time structure from motion (SfM) processing in a computer vision system receiving images from a monocular camera are disclosed. The real time SfM processing described exploits constraints of the three dimensional (3D) environment that can be assumed for automotive applications and other applications with similar constraints.

39 Claims, 4 Drawing Sheets

(56) References Cited

OTHER PUBLICATIONS

"Bundler: Structure from Motion (SfM) for Unordered Image Collections", Cornell, available at http://www.cs.cornell.edu/~snavely/bundler/ on May 5, 2016, pp. 1-3.

Jaesik Choi, "Realtime On-Road Vehicle Detection with Optical Flows and Haar-Like Feature Detectors", University of Illinois at Urbana-Champaign, Computer Science Research and Tech Reports, 2012, available at http://hdl.handle.net/2142/30794, pp. 1-7.

Siddharth Choudhary, "Improving the Efficiency of SfM and its Applications", Center for Visual Information Technology, International Institute of Information Technology, Hyderabad, India, Jul. 2012, pp. 1-89.

"Eight-point algorithm" Wikipedia, available at https://en.wikipedia.org/wiki/Eight-point_algorithm on May 14, 2016, pp. 1-7.

Klaus Hamling and Gabriele Peters, "The Structure-From-Motion Reconstruction Pipeline—A Survey with Focus on Short Image Sequences", Kybernetika, vol. 46, No. 5, 2010, Czech Republic, pp. 926-937.

Chris Harris and Mike Stephens, "A Combined Corner and Edge Detector", Proc. of Fourth Alvey Vision Conference, 1988, United Kingdom, pp. 147-151.

Richard I. Hartley and Peter Sturm, "Triangulation", Computer Vision and Image Understanding, vol. 68, No. 2, Nov. 1997, pp. 146-157.

Tony Jebara et al, "3D Structure from 2D Motion", IEEE Signal Processing Magazine, vol. 16, Issue 3, May 1999, current version Aug. 6, 2002, pp. 66-84.

Mihir Mody et al, "High Performance Front Camera Adas Applications on TI's TDA3X Platform", 2015 IEEE 22nd International Conference on High Performance Computing (HiPC), Dec. 16-19, 2015, Bangalore, India, pp. 456-463.

E. Mouragnon et al, "Generic and Real-Time Structure from Motion", Computer Vision and Image Understanding, vol. 103, Issue 3, Sep. 2006, pp. 218-228.

Robert M. Haralick, et al, "Pose Estimation from Corresponding Point Data", IEEE Transactions on Systems, Man, and Cybernetics, vol. 19, Issue 6, Nov./Dec. 1989, pp. 1426-1446.

Mark Pupilli and Andrew Calway, "Real-time Structure from Motion for Augmented Reality", Technical Report, Department of Computer Science, University of Bristol, Oct. 2002, pp. 1-17.

Shiqi Li, et al, "Robust O(n) Solution to the Perspective-n-Point Problem", IEEE Transactions on Pattern Analysis and Vlachine Intelligence, vol. 34, No. 7, Jul. 2012, pp. 1444-1450.

Edward Rosten and Tom Drummond, "Machine Learning for High-Speed Corner Detection", Proceedings of the 9th European Conference on Computer Vision, vol. Part I, Graz, Austria, May 7-13, 2006, pp. 430-443.

Noah Snavely, et al, "Photo Tourism: Exploring Photo Collection in 3D" ACM Transactions on Graphics (TOG)—Proceedings of ACM SIGGRAPH 2006, vol. 25, Issue 3, Jul. 2006, pp. 835-846.

"TDA3x SoC Processors for Advanced Driver Assist Systems (ADAS) Technical Brief", SPRT704A, Texas Instruments, Inc., Oct. 2014, pp. 1-6.

Navid Nourani-Vatani, et al, "A Study of Feature Extraction Algorithms for Optical Flow Tracking", Proceedings of Australasian Conference on Robotics and Automation, Dec. 3-5, 2012, Victoria University of Wellington, New Zealand, pp. 1-7.

Shawn Recker, et al, "Statistical Angular Error-Based Triangulation for Efficient and Accurate Multi-View Scene Reconstruction", 2013 IEEE Workshop on Applications of Computer Vision (WACV), Jan. 15-17, 2013, Tampa, FL, pp. 68-75.

D. Robertson and R. Cipolla, "Structure from Motion", in M. Varga, ed., "Practical Image Processing and Computer Vision", Chapter 13, John Wiley & Sons Australia, Limited, 2009, pp. 1-49.

* cited by examiner

METHOD AND SYSTEM FOR REAL TIME STRUCTURE FROM MOTION IN A COMPUTER VISION SYSTEM

CROSS-REFERENCE TO RELATED APPLICATIONS

This application claims benefit of India Provisional Patent Application No. 7029/CHE/2015 filed Dec. 29, 2015, which is incorporated herein by reference in its entirety.

BACKGROUND OF THE DISCLOSURE

Field of the Disclosure

Embodiments of the present disclosure generally relate to computer vision systems, and more specifically relate to structure from motion in computer vision systems.

Description of the Related Art

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems use monocular cameras and rely on computer vision processing to detect objects in the field of view of one or more cameras. Structure from motion (SfM) processing is a critical operation in such systems in order to achieve understanding of the three-dimensional environment from two-dimensional images captured by the monocular camera.

SUMMARY

Embodiments of the present disclosure relate to methods and systems for real time structure from motion (SfM) processing in a computer vision system. In one aspect, a method for structure from motion processing in a computer vision system is provided that includes receiving a plurality of tracks of estimated two dimensional (2D) locations of points in a plurality of sequential frames captured by a monocular camera, and generating a cloud of three dimensional (3D) points by, for each track of the plurality tracks, triangulating an estimated location of a 3D point based on the 2D locations in the track, and including the 3D point in the cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold values to determine whether or not the 3D point is sufficiently robust, wherein a pair of threshold values consists of an angle size threshold and projection error threshold.

In one aspect, a method for structure from motion processing in a computer vision system is provided that includes generating a cloud of three dimensional (3D) points based on a plurality of sequential frames captured by a monocular camera, and merging the cloud with a previous cloud of 3D points to generate a final cloud of 3D points, wherein, for each 3D point in the previous cloud, determining whether or not to include the 3D point in the final cloud includes performing point correspondence between a most recent frame in the plurality of sequential frames and a next most recent frame in the plurality of frames to attempt to locate a first two dimensional (2D) point in the most recent frame corresponding to a second 2D point in the next most recent frame corresponding to the 3D point, computing an epipolar line for the first 2D point and an epipolar line for the second 2D point if the first 2D point is located, and including or not including the 3D point in the final cloud based Euclidean distances of the first 2D point and the second 2D point to respective epipolar lines.

In one aspect, a method for structure from motion processing in a computer vision system is provided that includes receiving a plurality of tracks of estimated two dimensional (2D) locations of points in N sequential frames captured by a monocular camera, and computing a three dimensional (3D) point cloud by estimating a 3D point corresponding to each track of the plurality of tracks, wherein two most recent frames in sliding windows of N sequential frames are used for point correspondence to estimate the 2D locations in the tracks and each track includes up to N 2D locations, wherein N>2.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
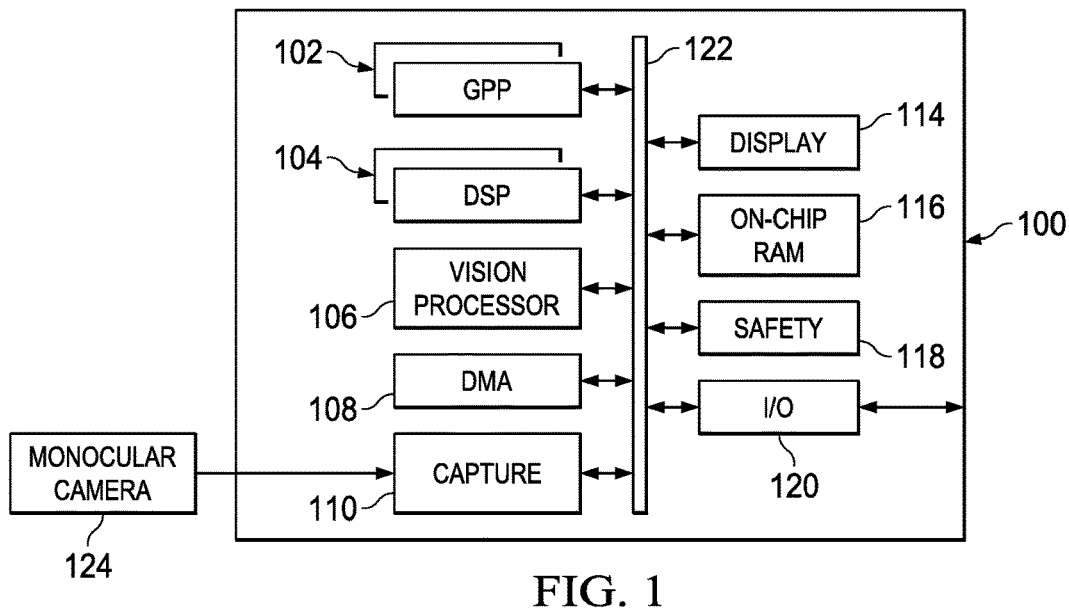
FIG. 1 is a high level block diagram of an example multiprocessor system-on-a-chip (SOC) configured for use in a monocular camera-based automotive safety application.

Specific embodiments of the disclosure will now be described in detail with reference to the accompanying figures. Like elements in the various figures are denoted by like reference numerals for consistency.

As previously mentioned, structure from motion (SfM) processing is a critical operation in the computer vision processing performed in many camera-based embedded safety systems. Many prior art SfM approaches are directed to three dimensional (3D) reconstruction from image collections in which the images are taken from various view points and possibly by different cameras. Microsoft Photo Tourism and Bundler developed at Cornell University are two examples of this SfM approach. Such SfM approaches are directed to 360 degree three-dimensional (3D) reconstruction and are typically not suitable for use in real time reconstruction. In automotive safety systems, images (frames) are generated in real time and any SfM approach used needs to process the images in real time. Embodiments of the disclosure provide for real time SfM processing in a computer vision system receiving images from a monocular camera. The real time SfM processing described herein exploits constraints of the 3D environment that can be assumed for automotive applications.

FIG. 1 is a high level block diagram of an example multiprocessor system-on-a-chip (SOC) 100 configured for use in a monocular camera-based ADAS. In particular, the example SOC 100 is an embodiment of the TDA3X SOC available from Texas Instruments, Inc. A high level description of the components of the SOC 100 is provided herein. More detailed descriptions of example components may be found in M. Mody, et al., "High Performance Front Camera ADAS Applications on TI's TDA3X Platform," Proceedings of 2015 IEEE $22^{nd}$ International Conference on High Performance Computing, Dec. 16-19, 2015, Bangalore, India, pp. 456-463, and "TDA3x SOC Processors for Advanced Driver Assist Systems (ADAS) Technical Brief," Texas Instruments, SPRT704A, October, 2014, pp. 1-6, which are incorporated by reference herein.

The SOC 100 includes dual general purpose processors (GPP) 102, dual digital signal processors (DSP) 104, and a vision processor 106 coupled via a high speed interconnect 122. The SOC 100 further includes a direct memory access (DMA) component 108, a camera capture component 110 coupled to a display management component 114, on-chip random access (RAM) memory 116, and various input/output (I/O) peripherals 120 all coupled to the processors via the interconnect 122. In addition, the SOC 100 includes a safety component 118 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures. Software implementing real-time SfM as described herein may be stored in the memory 116 and may execute on one or more programmable processors of the SOC 100.

Figure 2:
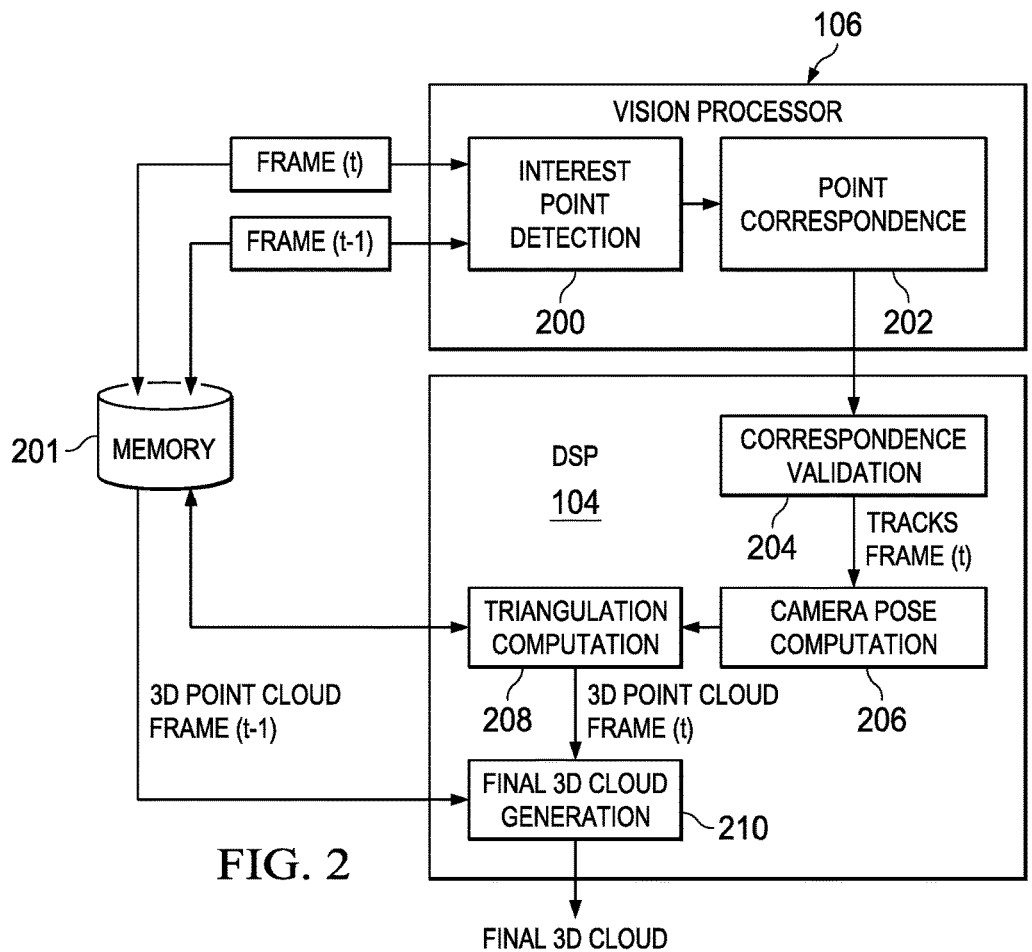
FIG. 2 is diagram illustrating data flow through an example real time structure from motion (SfM) reconstruction pipeline implemented on the example SOC of FIG. 1.

FIG. 2 is a diagram illustrating data flow through an embodiment of a real time SfM reconstruction pipeline as implemented as part of a computer vision system implemented on the example SOC 100 of FIG. 1. The SfM reconstruction pipeline generates a 3D point cloud after each input frame is received. At a high level, the SfM reconstruction pipeline detects and tracks two dimensional (2D) locations of interest points across sequential frames, storing the 2D locations in tracks corresponding to the interest points. Thus, a track is a sequence of 2D frame coordinates of an interest point over time. Triangulation is performed on each of the tracks to generate a 3D point cloud that is then used to generate a final 3D point cloud.

Figure 3:
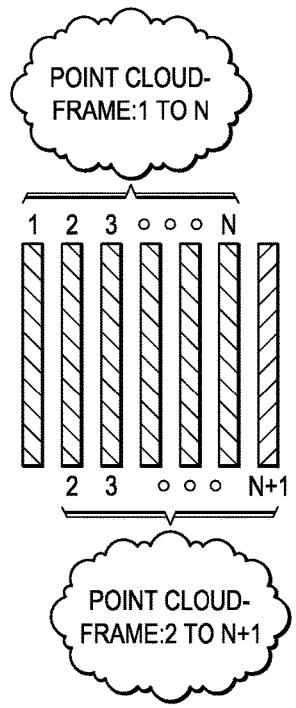
FIG. 3 is an example illustrating sliding window processing in the SfM reconstruction pipeline of FIG. 2.

Further, the pipeline operates in a sliding window fashion as illustrated in FIG. 3. A window includes N frames, the N frames being the previously processed N−1 frames and the current frame. As will be explained in more detail herein, each output point cloud is based on the frames in the current window. Further, the triangulation performed to estimate 3D points uses up to N 2D locations in N frames in the current sliding window for each interest point. Any suitable value of N may be used and the value of N may be chosen as a tradeoff between point cloud quality (quality increases as the value of N increases) and considerations such as computational complexity, performance, memory size, etc. For ease of description, N=6 is assumed in the description below.

Referring to FIG. 2, each time a frame is received from the monocular camera 124 via the capture component 110 interest point detection 200 is performed on the frame, i.e., frame (t), to detect interest points. Frame (t) and the detected interest points are stored in memory 201. The memory 201 may be, for example, the on-chip RAM 116 of FIG. 1. The detection 200 of interest points, also referred to as key points or features, may be performed using any suitable technique for interest point detection. For example, the interest point detection may be based on Harris corner detection or the features from accelerated segment test (FAST) detection. Harris corner detection is described, for example, in C. Harris and M. Stephens, "A Combined Corner and Edge Detector," Proceedings of Fourth Alvey Vision Conference, Manchester, UK, pp. 147-151, 1988. FAST is described, for example, in E. Rosten and T. Drummond, "Machine Learning for High Speed Corner Detection," Proceedings of $9^{th}$ European Conference on Computer Vision, Vol. 1, Graz, Austria, May 7-13, 2006, pp. 430-443.

Once the interest points are detected in frame (t), point correspondence 202 between the current frame (t) and the previous frame (t−1) is performed. In general, the point correspondence matches interest points found in the previous frame (t−1) and each of the current tracks to the current frame (t). In the latter case, the newest 2D point in a current track is used for the point correspondence. Note that the newest 2D point in a track is a 2D point found in frame (t−1) when point correspondence was performed between frame (t−1) and frame (t−2). Also note that current tracks are stored in memory 201. If a correspondence for an interest point detected in the previous frame (t−1) is not found in the current frame (t), the interest point is deleted. Also, if a correspondence for an existing track is not found in the current frame (t), the track is deleted. Any suitable technique for point correspondence may be used. For example, an optical flow technique may be used. Some suitable optical flow techniques are described, for example, in J. Barron, et al., "Performance of Optical Flow Techniques," International Journal of Computer Vision, Vol. 12, No. 1, pp. 43-77, 1994.

Correspondence validation 204 is then performed to validate the point correspondences between the previous frame (t−1) and the current frame (t). To perform the validation, the camera fundamental matrix is computed based on the corresponding interest points between the current frame (t) and the previous frame (t−1). Any suitable technique for computing the fundamental matrix may be used. One example technique is described in "Eight-point Algorithm", Wikipedia, available at https://en.wikipedia.org/wiki/Eight-point_algorithm on May 14, 2016. The fundamental matrix is then used to evaluate the quality of the point correspondences, i.e., to validate the point correspondences. The use of the fundamental matrix to validate point correspondences is well known and is not further explained herein.

If a point correspondence for an interest point is not valid, the interest point is deleted. Otherwise, a new track is formed that includes the 2D location of the interest point and the 2D location of the corresponding point in frame (t). Also, if a point correspondence for an existing track is valid, the 2D location of the corresponding point is added to the track. Otherwise, the track is deleted. In addition, the interest points detected in frame (t) are pruned. That is, an interest point detected in frame (t) has coordinates very close to or exactly the same as any 2D location in a current track, the detected interest point is deleted.

The number of 2D locations in a track is bounded by the number of frames in the sliding window, i.e., any given track may have at most six point coordinates, five coordinates from the previous five frames and the coordinates from the current frame. If there are already six coordinates in a track when frame (t) is processed, the oldest coordinates are dropped from the track and coordinates from frame (t) are added.

Camera pose computation 206 is then performed. Camera pose consists of six degrees of freedom made up of the rotation, i.e., roll, pitch, and yaw, and 3D translation of the camera with respect the world. The output of the camera pose computation 206 is a three degree of rotation vector and a three degree of translation vector. The problem of estimating the pose of a calibrated camera given a set of n 3D points in the world and their corresponding 2D projections in a frame is referred to as Perspective-n-Point (PnP). The pose of a camera in the form of rotation and translation can be found given a set of n 3D points and their corresponding 2D image projections. Any suitable PnP solution technique may be used, such as, for example, the technique described in S. Li, et al., "A Robust O(n) Solution to the Perspective-n-Point Problem," IEEE Transactions on Pattern Analysis and Machine Intelligence, Vol. 34, Issue 7, July, 2012, pp. 1444-1450.

Note that PnP techniques require the point cloud generated in the previous iteration through the SfM reconstruction pipeline. For the first pair of frames processed in the pipeline either at startup or after failure to generate a point cloud in a previous iteration, there is no point cloud to be used. In some embodiments, a singular value decomposition (SVD) technique is used for pose estimation in such situations. The inputs to the SVD technique are the two frames, the interest point correspondences between the two frames, and the fundamental matrix. In subsequent iterations, a point cloud is available and pose estimation is performed using a PnP technique. Any suitable SVD based technique may be used. One example technique is described in R. Haralick, et al., "Pose Estimation from Corresponding Point Data," IEEE Transactions on Systems, Man, and Cybernetics, Vol. 19, Issue 6, pp. 1426-1446, November/December 1989.

Figure 4:
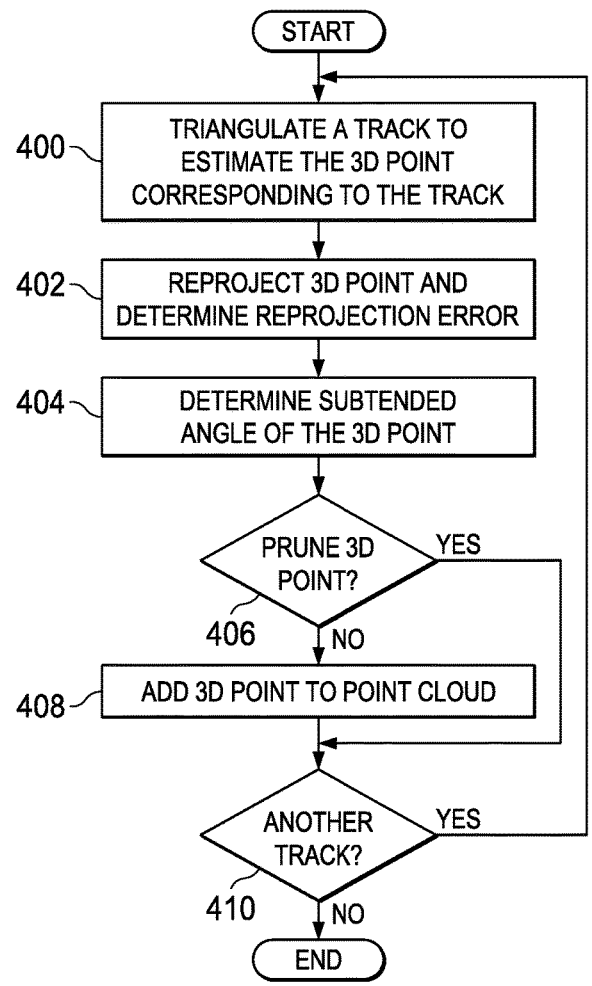
FIG. 4 is a flow diagram of a method for generating a 3D point cloud in the SfM reconstruction pipeline of FIG. 2.

Triangulation computation 208 is then performed to generate a point cloud corresponding to the frames in the current sliding window. FIG. 4 is a flow diagram of a method performed by the triangulation computation 208 to generate the 3D point cloud. For each track 410, triangulation 400 is performed to find the 3D position corresponding to the 2D positions in the track. As previously mentioned, a track records the position of an interest point in two or more consecutive frames in the current sliding window. The triangulation 400 uses the 2D coordinates in the track find the corresponding 3D position based on the current estimated camera pose and the current fundamental matrix. Because the sliding window size is six frames, the track for an interest point can have at most six 2D coordinates.

Any suitable triangulation technique may be used. Some suitable techniques are described, for example, R. Hartley and P. Sturm, "Triangulation," Computer Vision and Image Understanding, Vol. 68, No. 2, pp. 146-157, November, 1997 ("Hartley" herein), which is incorporated by reference herein. In some embodiments, an iterative least squares technique as described in Hartley is used. While Hartley described triangulation using two frames, one of ordinary skill in the art will understand that the technique in Hartley can be extended to more than two frames.

Once the 3D point corresponding to the track is estimated, the 3D point is reprojected 402 into the frames of the two 2D points used to estimate the 3D position and the reprojection error for each 2D point is determined 402. In general, reprojection error is the geometric error corresponding to the Euclidean distance between a projected 2D point and the corresponding measured 2D point. The reprojection error quantifies how closely an estimate of a 3D point recreates the true projection of a measured 2D point. That is, ideally, the reprojection error is zero, and a non-zero value indicates error in the triangulation. Thus, the reprojection error may be an indication of the robustness of the 3D point.

Figure 5:
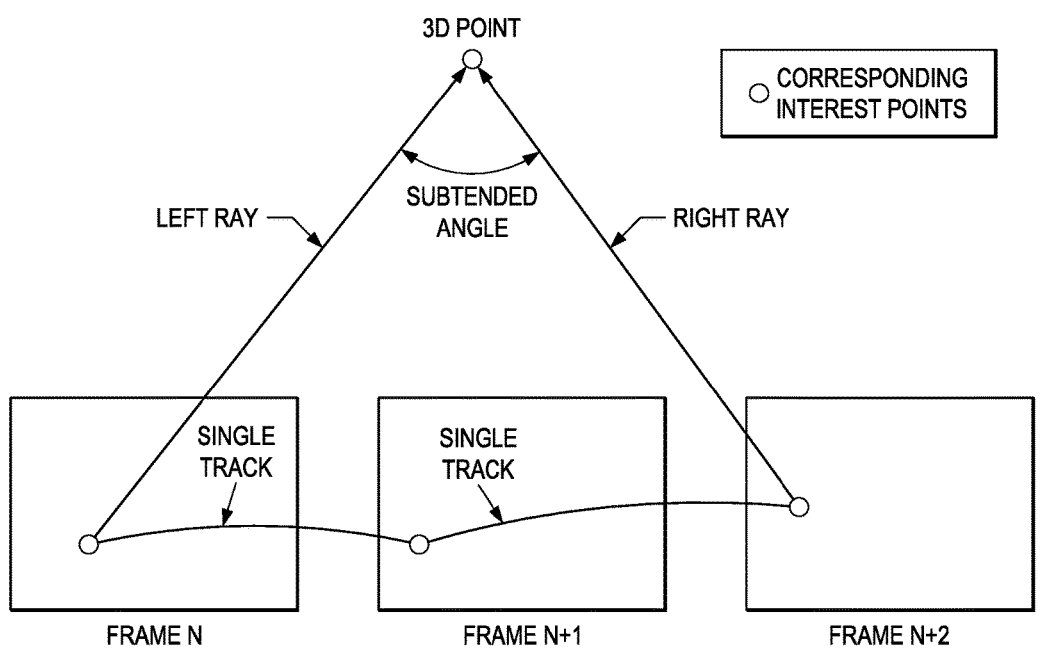
FIG. 5 is an example illustrating the subtended angle for an estimated 3D point.

In addition, the subtended angle of the 3D point is determined 404. FIG. 5 is an example illustrating the subtended angle for an estimated 3D point. In this example, the track for the interest point includes three 2D points corresponding to locations in each of three consecutive frames. The subtended angle is formed by the intersection of the left ray and the right ray at the 3D point. The left ray passes through the optical center and the measured 2D point location in Frame N and the right ray passes through the optical center and measured 2D point location in Frame N+2. The size of the subtended angle may be an indication of the robustness of the 3D point as smaller angles can adversely affect the quality of the triangulation.

Referring again to FIG. 4, a determination 406 is made as to whether or not to prune the 3D point, i.e., as to whether or not to include the 3D point in the point cloud. This decision is based on the reprojection errors of the 2D points triangulated to estimate the 3D point, and on the size of the subtended angle of the estimated 3D point. In general, the angle size and the sum of the reprojection errors are compared to respective empirically determined thresholds and the results of the comparisons are used to decide whether the 3D point is sufficiently robust to include in the point cloud.

In many vision applications, a single subtended angle threshold and a single projection error threshold are sufficient for pruning. However, using single threshold values is problematic in automotive applications, especially in applications using front mounted cameras. When the vehicle is moving forward in a straight line, the subtended angles of points corresponding to objects in front of the car can become very small. This effect is more pronounced when the points corresponding to an object of interest fall near the optical center. Robustly detecting objects in the center is critical in order to take action of avoid hitting such objects. Tests have shown that such automotive applications, setting the angle threshold to 0.25 degrees prunes too many 3D points near the optical center which lowers the density of the 3D points whereas setting the angle threshold to 0.125 degrees does not provide sufficient pruning, thus retaining too many poorly reconstructed 3D points. There is not a single angle threshold value that yields both a good density of 3D points around the optical center while also pruning poorly reconstructed 3D points.

In some embodiments, rather than using a single value for the subtended angle threshold and a single value for the projection error threshold, the projection error and subtended angle values are tested against multiple pairs of progressively smaller respective threshold values chosen such that when the size of the subtended angle is larger, more projection error is tolerated in the pruning decision and when the size of the subtended angle is smaller, less projection error is tolerated in the pruning decision. The use of progressively smaller threshold values ensures that otherwise robust 3D points with smaller subtended angles and acceptable projection error are not pruned.

The example pseudo code of Table 1 illustrates this approach to pruning. In this example pseudo code, subtendedAngle is the size of the subtended angle, projectionError is the sum of the reprojection errors of the two 2D points, angleTh is the base angle size threshold, projectionErrTh is the base projection error threshold, and the kx, x=1, 2, 3, 4, are scale factors used to reduce angleTH and projectionErrTh. If either the subtended angle size or the projection error fail the respective threshold comparison test, the base thresholds are reduced by the next larger scale factor, and the threshold comparison tests are tried again. A 3D point is pruned if all of the scale factors are tried unsuccessfully. Any suitable values for the base angle size threshold, the base projection error threshold, and the scale factors may be used. In some embodiments, these values are determined empirically. Further, one of ordinary skill in the art will understand embodiments in which more or fewer scaling factors are used.

TABLE 1

```
k1= 2; k2= 4; k3 = 8; k4 =16
prune = true;
if((subtendedAngle>=angleTh)&&(projectionError<=projectionErrTh)) {
    prune = false;
} else if ((subtendedAngle >= angleTh/k1 && (projectionError <=
projectionErrTh/k1)) {
    prune = false;
} else if ((subtendedAngle >= angleTh/k2) && (projectionError <=
projectionErrTh/k2)) {
    prune = false;
} else if ((subtendedAngle >= angleTh/k3) && (projectionError <=
projectionErrTh/k3)) {
    prune = false;
} else if ((subtendedAngle >= angleTh/k4) && (projectionError <=
projectionErrTh/k4)) {
    prune = false;
}
```

Referring again to FIG. 2, after triangulation computation 208, final 3D point cloud generation 210 is performed. The final 3D point cloud is generated by merging the 3D point cloud output by the triangulation computation 208 with the 3D point cloud generated for the previous sliding window. A simple merger of the two point clouds is problematic since new points in the current point cloud may correspond to a new object that occludes an object corresponding to older points in the previous point cloud. Such older points should not be carried forward to the final point cloud as these points are not representative of the new object.

Figure 6:
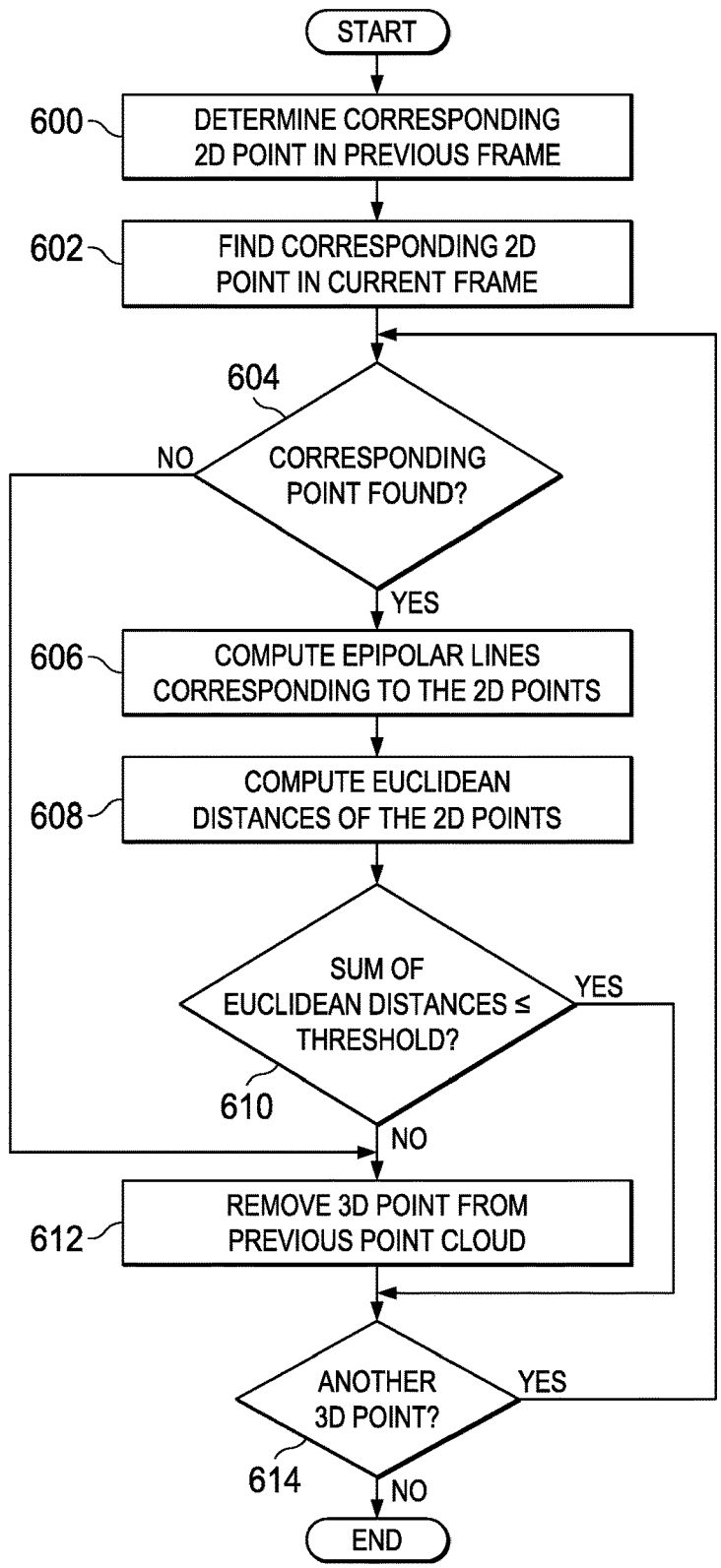
FIG. 6 is a flow diagram of method for determining whether or not 3D points in a point cloud are to be carried forward.

In some embodiments, before the two point clouds are merged, 3D points in the previous 3D point cloud are tested using the fundamental matrix relationship test to decide whether or not the 3D point should be carried forward into the final 3D point cloud. FIG. 6 is a flow diagram of an example method that may be used to decide whether or not a 3D point is to be carried forward. Initially, the 2D point in the previous frame (t−1) corresponding to a 3D point in the previous 3D point cloud is determined 600 from the track corresponding to the 3D point. A 2D point corresponding to the 2D point in the previous frame (t−1) is then found 602 in the current frame (t) using point correspondence. Any suitable technique for point correspondence may be used, such as, for example, the techniques previously mentioned herein. If the point correspondence does not find 604 a valid corresponding point in the current frame (t), the 3D point is removed 612 from the previous 3D point cloud and processing continues 614 with the next 3D point, if any.

If a valid corresponding point was found 604, the fundamental matrix relationship test is applied 606-610 to determine if the 3D point is to be carried forward. More specifically, the epipolar lines corresponding to the 2D points are computed 606 using the fundamental matrix. That is, if x is the 2D point in the previous frame (t−1), x' is the corresponding 2D point in the current frame (t), and F is the fundamental matrix, l'=Fx is the epipolar line corresponding to x and l=$F^T$x' is the epipolar line corresponding to x'. The Euclidean distance of each 2D point to the corresponding epipolar line is then computed 608. The sum of the Euclidean distances is then compared 604 to a threshold to determine whether or not the 3D point is to be carried forward. If the sum is sufficiently small, i.e., is less than or equal to the threshold, the 3D point is carried forward. Otherwise, the 3D point is removed 612 from the previous point cloud. In either instance, processing continues 614 with the next 3D point, if any. Any suitable value may be used for the threshold. The value may be determined empirically.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described here in which the camera pose estimate is computed using a PnP solution technique. One of ordinary skill in the art will understand embodiments in which an inertial measurement unit (IMU) is used to enhance the pose estimate found using a PnP solution technique or in which an IMU replaces the camera pose estimation.

In another example, embodiments have been described herein in which interest point detection is performed. One of ordinary skill in the art will understand embodiments in which the interest point detection is not performed, and point correspondence is performed for all pixels (points) in a frame.

In another example, one of ordinary skill in the art will understand embodiments in which a suitable technique for bundle adjustment is added to the SfM reconstruction pipeline for joint optimization of the camera pose estimation and the triangulation.

In another example, embodiments have been described herein in which the processing performed in the SfM reconstruction pipeline is implemented as software instructions executed on processors in a multiprocessor SOC. One of ordinary skill in the art will understand that the functionality of the SfM reconstruction pipeline may be implemented as any suitable combination of software, firmware, and hardware. For example, some of the functionality may be implemented in one or more hardware accelerators, application specific integrated circuits (ASICs), field-programmable gate arrays (FPGAs), etc.

In another example, embodiments have been described herein in which carry forward processing is performed on all the 3D points in the previous point cloud to remove any 3D points that should not be carried forward prior to merging the previous point cloud and the current point cloud. One of ordinary skill in the art will understand embodiments in which the carry forward decision criteria described herein is applied to points in the previous point cloud as the two point clouds are merged.

In another example, embodiments have been described herein in reference to automotive safety systems. One of ordinary skill in the art will understand embodiments for other computer vision applications having similar environmental constraints, such as, for example, industrial applications, robotics, consumer applications such as vacuum cleaners, and drones.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method for structure from motion processing in a computer vision system, the method comprising:
   receiving in the computer vision system a plurality of tracks of estimated two dimensional (2D) locations of points in a plurality of sequential frames captured by a monocular camera; and
   generating in the computer vision system a cloud of three dimensional (3D) points by, for each track of the plurality tracks,
   triangulating an estimated location of a 3D point based on the 2D locations in the track; and
   including the 3D point in the cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold values to determine whether or not the 3D point is sufficiently robust, wherein a pair of threshold values consists of an angle size threshold and projection error threshold.

2. The method of claim 1, wherein an initial threshold pair of the plurality of pairs of threshold values includes a base angle size threshold value and a base projection error threshold value and threshold values in other pairs of the progressively smaller respective threshold values are determined by applying corresponding predetermined progressively larger scale factors to the base angle size threshold and the base projection error threshold.

3. The method of claim 2, wherein there are five pairs of progressively smaller respective threshold values, and the progressively larger scale factors are 2, 4, 8, and 16.

4. The method of claim 1, wherein two most recent frames in sliding windows of N sequential frames are used for point correspondence to estimate the 2D locations in the plurality of tracks and each track includes up to N 2D locations, wherein a number of frames in the plurality of sequential frames is N and N>2.

5. The method of claim 4, wherein N=6.

6. The method of claim 1, further comprising:
   merging the cloud with a previous cloud of 3D points to generate a final cloud of 3D points, wherein, for each 3D point in the previous cloud, determining whether or not to include the 3D point in the final cloud comprises:
   performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point;
   computing an epipolar line for the first 2D point and an epipolar line for the second 2D point if the first 2D point is located; and
   including the 3D point in the final cloud based Euclidean distances of the first 2D point and the second 2D point to respective epipolar lines.

7. The method of claim 1, wherein the points are interest points.

8. The method of claim 1, wherein the computer vision system is comprised in an automotive safety system.

9. A method for structure from motion processing in a computer vision system, the method comprising:
   generating in the computer vision system a cloud of three dimensional (3D) points based on a plurality of sequential frames captured by a monocular camera; and
   merging in the computer vision system the cloud with a previous cloud of 3D points to generate a final cloud of 3D points, wherein, for each 3D point in the previous cloud, determining whether or not to include the 3D point in the final cloud comprises:
   performing point correspondence between a most recent frame in the plurality of sequential frames and a next most recent frame in the plurality of frames to attempt to locate a first two dimensional (2D) point in the most recent frame corresponding to a second 2D point in the next most recent frame corresponding to the 3D point;
   computing an epipolar line for the first 2D point and an epipolar line for the second 2D point if the first 2D point is located; and
   including the 3D point in the final cloud based on Euclidean distances of the first 2D point and the second 2D point to respective epipolar lines.

10. The method of claim 9, wherein generating a cloud of 3D points comprises:
    receiving a plurality of tracks of estimated 2D locations of points in the plurality of sequential frames; and
    computing the point cloud by estimating a 3D point corresponding to each track of the plurality of tracks, wherein two most recent frames in sliding windows of N sequential frames are used for point correspondence to estimate the 2D locations in the tracks and each track includes up to N 2D locations, wherein a number of frames in the plurality of frames is N and N>2.

11. The method of claim 10, wherein N=6.

12. The method of claim 9, wherein generating a point cloud of 3D points comprises:
    receiving a plurality of tracks of estimated two dimensional (2D) locations of points in the plurality of sequential frames; and
    generating a cloud of three dimensional (3D) points by, for each track of the plurality tracks,
    triangulating an estimated location of a three dimensional (3D) point based on the 2D locations in the track; and
    including the 3D point in the cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold values to determine whether or not the 3D point is sufficiently robust, wherein a pair of threshold values consists of an angle size threshold and projection error threshold.

13. The method of claim 12, wherein an initial threshold pair of the plurality of pairs of threshold values includes a base angle size threshold value and a base projection error threshold value and threshold values in other pairs of the progressively smaller respective threshold values are determined by applying corresponding predetermined progressively larger scale factors to the base angle size threshold and the base projection error threshold.

14. The method of claim 13, wherein there are five pairs progressively smaller respective threshold values, and the progressively larger scale factors are 2, 4, 8, and 16.

15. A method for structure from motion processing in a computer vision system, the method comprising:
receiving in the computer vision system a plurality of tracks of estimated two dimensional (2D) locations of points in N sequential frames captured by a monocular camera;
computing in the computer vision system a three dimensional (3D) point cloud by estimating a 3D point corresponding to each track of the plurality of tracks, wherein two most recent frames in sliding windows of N sequential frames are used for point correspondence to estimate the 2D locations in the tracks and each track includes up to N 2D locations, wherein N>2; and
merging the 3D point cloud with a previous 3D point cloud to generate a final 3D point cloud, wherein, for each 3D point in the previous cloud, determining whether or not to include the 3D point in the final cloud comprises:
performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point;
computing an epipolar line for the first 2D point and an epipolar line for the second 2D point if the first 2D point is located; and
including the 3D point in the final cloud based Euclidean distances of the first 2D point and the second 2D point to respective epipolar lines.

16. A method for structure from motion processing in a computer vision system, the method comprising:
receiving in the computer vision system a plurality of tracks of estimated two dimensional (2D) locations of points in N sequential frames captured by a monocular camera;
computing in the computer vision system a three dimensional (3D) point cloud by estimating a 3D point corresponding to each track of the plurality of tracks, wherein two most recent frames in sliding windows of N sequential frames are used for point correspondence to estimate the 2D locations in the tracks and each track includes up to N 2D locations, wherein N>2; and
wherein computing the 3D point cloud comprises:
generating the 3D point cloud by, for each track of the plurality of tracks,
triangulating an estimated location of a three dimensional (3D) point based on the 2D locations in the track; and
including the 3D point in the 3D point cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold values to determine whether or not the 3D point is sufficiently robust, wherein a pair of threshold values consists of an angle size threshold and projection error threshold.

17. The method of claim 16, wherein an initial threshold pair of the plurality of pairs of threshold values includes a base angle size threshold value and a base projection error threshold value and threshold values in other pairs of the progressively smaller respective threshold values are determined by applying corresponding predetermined progressively larger scale factors to the base angle size threshold and the base projection error threshold.

18. The method of claim 17, wherein there are five pairs progressively smaller respective threshold values, and the progressively larger scale factors are 2, 4, 8, and 16.

19. The method of claim 1, further comprising:
merging the cloud with a previous cloud of 3D points to generate a final cloud of 3D points, wherein, for each 3D point in the previous cloud, determining whether or not to include the 3D point in the final cloud comprises:
performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point;
computing an epipolar line for the first 2D point and an epipolar line for the second 2D point if the first 2D point is located; and
not including the 3D point in the final cloud based Euclidean distances of the first 2D point and the second 2D point to respective epipolar lines.

20. A method for structure from motion processing in a computer vision system, the method comprising:
receiving in the computer vision system a plurality of tracks of estimated two dimensional (2D) locations of points in N sequential frames captured by a monocular camera;
computing in the computer vision system a three dimensional (3D) point cloud by estimating a 3D point corresponding to each track of the plurality of tracks, wherein two most recent frames in sliding windows of N sequential frames are used for point correspondence to estimate the 2D locations in the tracks and each track includes up to N 2D locations, wherein N>2; and
merging the 3D point cloud with a previous 3D point cloud to generate a final 3D point cloud, wherein, for each 3D point in the previous cloud, determining whether or not to include the 3D point in the final cloud comprises:
performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point;
computing an epipolar line for the first 2D point and an epipolar line for the second 2D point if the first 2D point is located; and
including the 3D point in the final cloud based Euclidean distances of the first 2D point and the second 2D point to respective epipolar lines.

21. A method, comprising:
generating in a computer vision system a plurality of sequential frames captured by a monocular camera;
generating in the computer vision system a plurality of tracks of estimated two dimensional (2D) locations of points in the plurality of sequential frames captured by a monocular camera; and
generating in the computer vision system a cloud of three dimensional (3D) points by, for each track of the plurality tracks,
triangulating an estimated location of a 3D point based on the 2D locations in the track; and
including the 3D point in the cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold values to determine whether or not the 3D point is sufficiently robust, wherein a pair of threshold values consists of an angle size threshold and projection error threshold.

22. The method of claim 21, wherein an initial threshold pair of the plurality of pairs of threshold values includes a base angle size threshold value and a base projection error threshold value and threshold values in other pairs of the progressively smaller respective threshold values are determined by applying corresponding predetermined progressively larger scale factors to the base angle size threshold and the base projection error threshold.

23. The method of claim 22, wherein there are five pairs of progressively smaller respective threshold values, and the progressively larger scale factors are 2, 4, 8, and 16.

24. The method of claim 21, wherein two most recent frames in sliding windows of N sequential frames are used for point correspondence to estimate the 2D locations in the plurality of tracks and each track includes up to N 2D locations, wherein a number of frames in the plurality of sequential frames is N and N>2.

25. The method of claim 24, wherein N=6.

26. The method of claim 21, further comprising:
merging the cloud with a previous cloud of 3D points to generate a final cloud of 3D points, wherein, for each 3D point in the previous cloud, determining whether or not to include the 3D point in the final cloud comprises:
performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point;
computing an epipolar line for the first 2D point and an epipolar line for the second 2D point if the first 2D point is located; and
including the 3D point in the final cloud based Euclidean distances of the first 2D point and the second 2D point to respective epipolar lines.

27. The method of claim 21, further comprising:
merging the cloud with a previous cloud of 3D points to generate a final cloud of 3D points, wherein, for each 3D point in the previous cloud, determining whether or not to include the 3D point in the final cloud comprises:
performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point;
computing an epipolar line for the first 2D point and an epipolar line for the second 2D point if the first 2D point is located; and
not including the 3D point in the final cloud based Euclidean distances of the first 2D point and the second 2D point to respective epipolar lines.

28. The method of claim 21, wherein the points are interest points.

29. The method of claim 21, wherein the computer vision system is comprised in an automotive safety system.

30. A method for structure from motion processing in a computer vision system, the method comprising:
generating in the computer vision system a cloud of three dimensional (3D) points based on a plurality of sequential frames captured by a monocular camera; and
merging in the computer vision system the cloud with a previous cloud of 3D points to generate a final cloud of 3D points, wherein, for each 3D point in the previous cloud, determining whether or not to include the 3D point in the final cloud comprises:
performing point correspondence between a most recent frame in the plurality of sequential frames and a next most recent frame in the plurality of frames to attempt to locate a first two dimensional (2D) point in the most recent frame corresponding to a second 2D point in the next most recent frame corresponding to the 3D point;
computing an epipolar line for the first 2D point and an epipolar line for the second 2D point if the first 2D point is located; and
not including the 3D point in the final cloud based on Euclidean distances of the first 2D point and the second 2D point to respective epipolar lines.

31. The method of claim 30, wherein generating a cloud of 3D points comprises:
receiving a plurality of tracks of estimated 2D locations of points in the plurality of sequential frames; and
computing the point cloud by estimating a 3D point corresponding to each track of the plurality of tracks, wherein two most recent frames in sliding windows of N sequential frames are used for point correspondence to estimate the 2D locations in the tracks and each track includes up to N 2D locations, wherein a number of frames in the plurality of frames is N and N>2.

32. The method of claim 31, wherein N=6.

33. The method of claim 30, wherein generating a point cloud of 3D points comprises:
receiving a plurality of tracks of estimated two dimensional (2D) locations of points in the plurality of sequential frames; and
generating a cloud of three dimensional (3D) points by, for each track of the plurality tracks,
triangulating an estimated location of a three dimensional (3D) point based on the 2D locations in the track; and
including the 3D point in the cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold values to determine whether or not the 3D point is sufficiently robust, wherein a pair of threshold values consists of an angle size threshold and projection error threshold.

34. The method of claim 33, wherein an initial threshold pair of the plurality of pairs of threshold values includes a base angle size threshold value and a base projection error threshold value and threshold values in other pairs of the progressively smaller respective threshold values are determined by applying corresponding predetermined progressively larger scale factors to the base angle size threshold and the base projection error threshold.

35. The method of claim 34, wherein there are five pairs progressively smaller respective threshold values, and the progressively larger scale factors are 2, 4, 8, and 16.

36. A method for structure from motion processing in a computer vision system, the method comprising:
  generating in the computer vision system a plurality of tracks of estimated two dimensional (2D) locations of points in N sequential frames captured by a monocular camera;
  computing in the computer vision system a three dimensional (3D) point cloud by estimating a 3D point corresponding to each track of the plurality of tracks , wherein two most recent frames in sliding windows of N sequential frames are used for point corresponding to estimate the 2D locations in the tracks and each track includes up to N 2D locations wherein N>2;
  merging the 3D point cloud with a previous 3D point cloud to generate a final 3D point cloud, wherein, for each 3D point in the previous cloud, determining whether or not to include the 3D point in the final cloud comprises: performing point correspondence between a most recent frame in the plurality of sequential frames and a next most recent frame in the plurality of frames to attempt to locate a first 2D point in the most recent frame corresponding to a second 2D point in the next most recent frame corresponding to the 3D point; computing an epipolar line for the first 2D point and an epipolar line for the second 2D point if the first 2D point is located; and including the 3D point in the final cloud based Euclidean distances of the first 2D point and the second 2D point to respective epipolar lines.

37. A method for structure from motion processing in a computer vision system, the method comprising:
  generating in the computer vision system a plurality of tracks of estimated two dimensional (2D) locations of points in N sequential frames captured by a monocular camera; and
  computing in the computer vision system a three dimensional (3D) point cloud by estimating a 3D point corresponding to each track of the plurality of tracks , wherein two most recent frames in sliding windows of N sequential frames are used for point corresponding to estimate the 2D locations in the tracks and each track includes up to N 2D locations wherein N>2; wherein computing the 3D point cloud comprises: generating the 3D point cloud by, for each track of the plurality of tracks, triangulating an estimated location of a three dimensional (31) point based on the 2D locations in the track; and including the 3D point in the 3D point cloud when a size of a subtended angle of the 3D point and a projection error of the 3D point indicate that the 3D point is sufficiently robust for inclusion, wherein the size of the subtended angle and the projection error are tested against one or more of a plurality of pairs of progressively smaller respective threshold. values to determine whether or not the 3D point is sufficiently robust, wherein a pair of threshold values consists of an angle size threshold and projection error threshold.

38. The method of claim 37, wherein an initial threshold pair of the plurality of pairs of threshold values includes a base angle size threshold value and a. base projection error threshold value and threshold values in other pairs of the progressively smaller respective threshold values are determined by applying corresponding predetermined progressively larger scale factors to the base angle size threshold and the base projection error threshold.

39. The method of claim 38, wherein there are five pairs progressively smaller respective threshold values, and the progressively larger scale factors are 2, 4, 8, and 16.

* * * * *